Aug. 25, 1964  R. A. GARGRAVE  3,145,861

WORK HOLDER

Filed May 1, 1961

INVENTOR
ROBERT A. GARGRAVE
DECEASED
REBECCA G. GARGRAVE
EXECUTRIX

BY Tom Walker
ATTORNEY

… ……… ………… ………… ………… ………… ………… ……

United States Patent Office 3,145,861
Patented Aug. 25, 1964

3,145,861
WORK HOLDER
Robert A. Gargrave, deceased, late of Dayton, Ohio, by Rebecca G. Gargrave, executrix, Dayton, Ohio, assignor to Dayton Perforators, Inc., Dayton, Ohio, a corporation of Ohio
Filed May 1, 1961, Ser. No. 106,983
5 Claims. (Cl. 214—340)

This invention relates to machine tools and more particularly to improvements in work holders.

Functional problems exist with reference to prior apparatus for holding objects of small diameter and variable length which must be driven at high speed either to produce work on another object or to be worked on themselves. This is due to the fact that such apparatus is usually so designed that it has limited application and is not readily adaptable to meet the needs of changing conditions.

The present invention is directed to solution of the problems above indicated. It provides simple yet highly versatile work holders which may be readily adapted to accommodate various objects of small variable diameter or thickness and variable lengths and positively hold them and drive them in a precisely balanced condition.

A primary object of the invention is to provide improvements in work holders rendering them economical to fabricate, more efficient and satisfactory in use, adaptable to a great variety of applications and unlikely to malfunction.

A further object of the invention is to provide a work holder adapted to center and rotate an object in a manner to provide it with maximum stability.

Another object of the invention is to provide simplified apparatus for centering and holding objects, particularly those which are relatively elongated and small in cross-sectional dimension or thickness.

A further object of the invention is to provide a work holder possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a front elevation view of a work holder in accordance with the invention;

Like parts are indicated by similar characters of reference throughout the several views.

Figure 1:
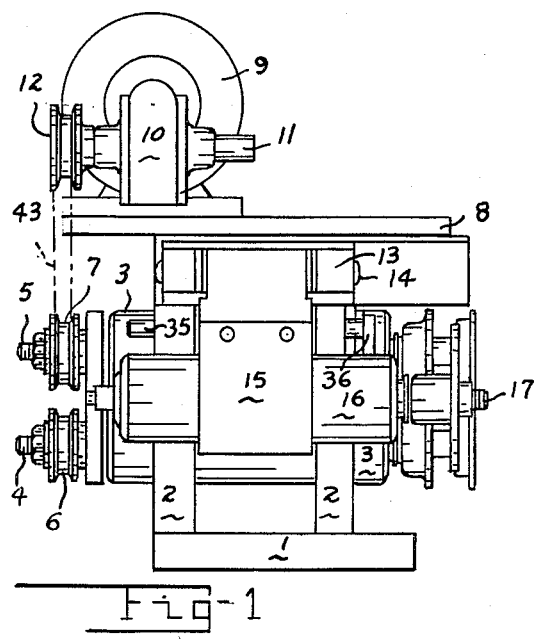
Figure 2:
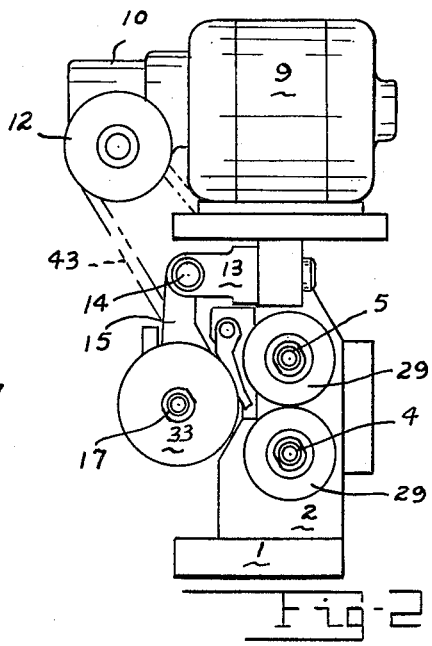
FIG. 2 is a side view thereof.
Figure 3:
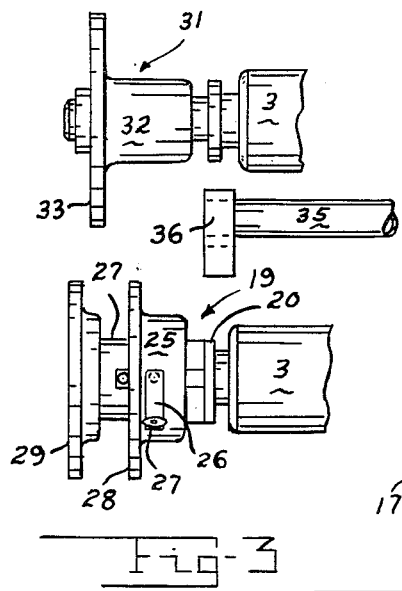
FIG. 3 is an enlarged fragmentary view of the work holding elements employed therein.
Figure 4:
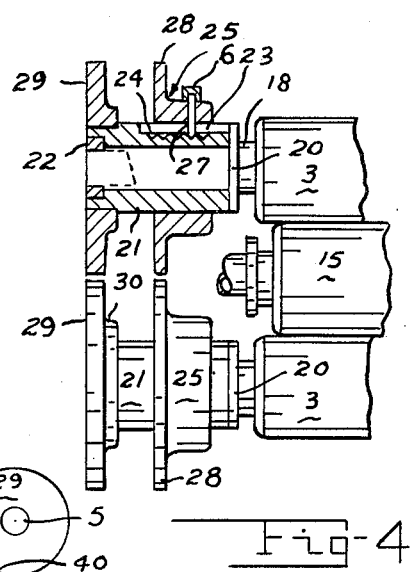
FIG. 4 is a fragmentary view of the holding elements of FIG. 3, portions thereof being shown partly in section.

The invention can be best described with reference to the embodiment shown in the drawings. The work holder illustrated includes a base 1 mounting a pair of standards 2 which project vertically thereof in spaced parallel relation. Bearing assemblies 3 supported transversely of the standards 2 rotatably mount shafts 4 and 5 in vertically spaced relation so as to be parallel to each other and to the base 1. The shafts 4 and 5 are oriented and of a length to project perpendicularly to the standards 2 and beyond the respective sides of the base 1. The shaft 4 is lowermost and has a pulley 6 fixed to one end outwardly of the base 1. The shaft 5 mounts a pulley 7 which is co-planar with the pulley 6.

An elevated platform 8 is supported on the upper ends of the standards 2 in a position parallel to the base 1. The platform projects outwardly of the base and over the pulley mounting ends of the shafts 4 and 5 to one end. A motor 9 fixed on the relatively projected end portion of the platform 8 has its drive shaft oriented at right angles to the plane of the shafts 4 and 5. The motor drive shaft is coupled to a transmission unit within a housing 10 fixed to the motor 9. This transmission unit drivingly relates the motor shaft to a shaft 11 which projects from the housing 10 in a sense parallel to and relatively offset from the plane of the shafts 4 and 5. The shaft 11 has a drive pulley 12 fixed to one end in a position co-planar with the pulleys 6 and 7 and operatively connected thereto by a drive belt 43. Thus, on energizing the motor 9, a direct and immediate drive of the shafts 4 and 5 is simultaneously effected.

Fixed to project forwardly of the standards 2, respectively co-planar therewith, are brackets 13. The brackets 13 rotatably support a shaft 14 in a position parallel to the shafts 4 and 5 and forwardly thereof. The shaft 14 in turn pivotally supports the upper end of a holding unit 15 to the lower end of which is mounted a bearing assembly 16. A shaft 17 is rotatably supported by and relatively projects from the bearing 16 in a position adjacent and parallel to the shafts 4 and 5 and intermediately thereof in a vertical sense.

The relatively projected extremities of the respective shafts 4 and 5 remote from the pulleys 6 and 7 are reduced in external diameter to provide a shoulder 18 thereon. An identical holding assembly 19 is fixed on each of the relatively reduced ends of the shafts 4 and 5 in a manner to establish them in vertically aligned relation.

The assembly 19 includes an annular plate 20 which abuts the shoulder 18 and a sleeve 21, one end of which abuts the plate 20 and the other end of which is co-planar with the adjacent extremity of the shaft to which it mounts. The sleeve 21 is suitably keyed to the shaft to which it mounts by any suitable means 22.

The inner end of the sleeve 21 adjacent the plate 20 has a longitudinal groove 23 therein the base surface of which is provided with a series of longitudinally spaced notches 24. A second sleeve 25 mounts concentrically with the inner end of the sleeve 21 so as to be slidably adjustable thereon. The sleeve 25 has a radial aperture adapted to radially align with the notches 24 in the sleeve 21. A short leaf spring 26 is bolted at one end to the external surface of the sleeve 25 and has its other end projected in a sense circumferentially thereof to bias a pin 27 connected integrally therewith through the radial aperture in the sleeve 25 and into selected notch 24 in the sleeve 21 depending on their relative position. By releasing the pin 27 from a notch 24 in an obvious manner the sleeve 25 may be adjusted axially of the sleeve 21 to a selected position thereon whereupon the pin 27 may be released to be biased into a notch 24 and thereby fix the position of the sleeves once again in a relative sense. The sleeve 25 has a radially projected disc 28 to its end remote from the plate 20.

The outer end of the sleeve 21 is also reduced in external diameter to fixedly mount a disc-type plate 29 parallel to the disc portion 28 of the sleeve 25. The disc-type plate 29 has a slightly projected hub portion 30 at its face adjacent the element 28.

It may thus be seen that a selected spacing of the disc elements 28 and 29 may be easily and quickly effected to provide predetermined positions thereof on each of the shafts 4 and 5.

The end of the shaft 17 adjacent the assemblies 19 on the shafts 4 and 5 mounts a holding unit 31 including a sleeve 32 having a radially projected disc 33 to one end. The sleeve 32 is coupled to the shaft 17 through means such as described with reference to the sleeve 25 so as to provide for adjustment thereof axially of the shaft 17.

The standards 2 also include portions which rotatably support a shaft 35 transversely thereof in a position parallel to the shafts 4, 5 and 17 and intermediately thereof. An arm 36 is fixed to the end of the shaft 35 most adjacent the assemblies 19 on the shafts 4 and 5. This shaft 35 and its arm 36 provides a limit gage which is axially adjustable with respect to the assemblies 19 for purposes to be further described. Suitable means (not shown) are provided to fix the relative position of the shaft 35 with respect to the standards 2, as needed.

Figure 5:
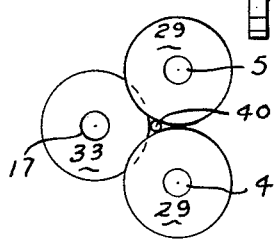
FIG. 5 is a generally schematic illustration of the holding elements and their function.

The work holder above described is admirably suited for fixing a small diameter rod, for example, between the assemblies 19 and 31 to be rotatably driven thereby either to produce work or to be worked on. To apply a rod, which is indicated in the drawings by the numeral 40, one need only fix the position of the shaft 35 to appropriately dispose the arm 36 immediately to the rear of the assemblies 19 so that one end of the rod 40 may abut the arm 36 and its other end may be projected to the degree required, past the assemblies 19 to simultaneously bear on each of the spaced disc elements thereof and be confined thereto by the disc 33 which is positioned in a plane relatively intermediate the disc elements of the respective assemblies 19. Suitable fixing means are of course provided with relation to the holding unit 15 to contain the disc 33 to maintain the position of the rod 40 relative the pair of discs on the assemblies 19. It may be readily seen that on energizing the motor 9 the shafts 4 and 5 are jointly and simultaneously driven to rotate the rod 40, the drive being accommodated by the rotation of the shaft 17. In effect, the rod 40 is provided with a five point precisely balanced support and the drive thereof is essentially friction free. The operative relation of the holding components may be readily observed from the schematic view in FIG. 5 of the drawings.

The above described embodiment of the invention indicates how simply a work holder may be effected which is more versatile in application and more readily adaptable to meet the ever changing needs of production facilities. The work holder provided may be economically fabricated and relatively free of complex mechanism which could introduce inefficiencies and malfunctions in this type of holding equipment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

What is claimed is:

1. Work holding apparatus comprising, a support structure, parallel shaft means rotatably mounting to said support structure in vertically spaced relation thereon, adjacent end portions of said shaft means being projected outwardly of said support structure, longitudinally spaced disc elements mounted on each of relatively adjacent projected end portions of said shaft means, means connected for a conjoint and simultaneous drive of said shaft means, means including a single rotatable shaft means pivotally suspended to one side of said support structure, said single shaft means having a disc mounting for rotation thereon and positionable thereby to nest intermediately of and parallel to said longitudinally spaced disc elements whereby to confine a thin elongated work member in bridging relation to the edges of said disc elements and balanced thereby for rotation therebetween.

2. Work holding apparatus comprising, a support structure, parallel shaft means rotatably mounting to said support structure in spaced relation thereon, a pair of adjacent end portions of said shaft means being projected outwardly of said support structure, a sleeve element fixed on each of said pair of adjacent projected end portions of said shaft means, a disc element fixed on one end of each sleeve element, a second disc element fixed for adjustment longitudinally of each said sleeve element, said disc elements being longitudinally and transversely spaced thereby, means connected for rotating said shaft means in conjoint fashion, means including a single shaft means pivotally mounted on said support structure, said single shaft means having a disc unit mounting for rotation thereon and positionable thereby to nest intermediately of and parallel to said spaced disc elements on each of the aforementioned pair of adjacent projected end portions of said shaft means whereby to achieve a balanced containment of a thin work member in bridging relation to the longitudinally spaced disc elements for rotation thereby.

3. Work holding apparatus including support means, parallel vertically spaced shaft means rotatably mounted in side by side relation on said support means having, on each of adjacent portions thereof, longitudinally spaced radially projected disc elements, the disc elements on the respective shaft means being so related to have their outer peripheral edges nest therebetween a slender work element in bridging relation thereto and additional shaft means suspended from said support means for rocking adjustment to and from said parallel shaft means and having a relatively rotatable disc means longitudinally adjustable thereon and positioned thereby intermediately of and in nesting relation to the respective longitudinally spaced discs on said parallel shaft means to confine the work element in nested relation thereto for rotation thereby.

4. Work holding apparatus including support means, a pair of parallel shaft means rotatably mounted in side by side relation on said support means to have adjacent end portions project therefrom, each of a pair of adjacent projected end portions of said parallel shaft means having a pair of longitudinally spaced parallel disc elements thereon, said longitudinally spaced pairs of disc elements being positioned thereby in relatively aligned relation to form a nest for a rod-like work element at adjacent peripheral edge portions thereof and means mounting a single disc element for rotation thereon with reference to said support means and positionable thereby to nest between said longitudinally spaced disc elements and confine the work element thereto for rotation therebetween.

5. The apparatus as set forth in claim 4 characterized by said last named means comprising a body suspended at one end from said support means and having shaft means rotatably mounting therein to rotatably mount said single disc element.

References Cited in the file of this patent
UNITED STATES PATENTS

| | | |
|---|---|---|
| 1,713,678 | Seibert | May 21, 1929 |
| 1,783,797 | Klein | Dec. 2, 1930 |
| 1,972,316 | Randolph | Sept. 4, 1934 |
| 2,417,678 | Cox | Mar. 18, 1947 |
| 2,418,871 | Danielson | Apr. 15, 1947 |
| 2,616,108 | Luft | Nov. 4, 1952 |
| 2,855,728 | Lindh | Oct. 14, 1958 |
| 3,041,691 | Vanier | July 3, 1962 |